(12) United States Patent
Krichevsky

(10) Patent No.: US 10,852,491 B2
(45) Date of Patent: Dec. 1, 2020

(54) OPTICAL ISOLATOR BRIDGE

(71) Applicant: Intel Corporation, Santa Clara, CA (US)

(72) Inventor: Alexander Krichevsky, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/228,577

(22) Filed: Dec. 20, 2018

(65) Prior Publication Data

US 2019/0146164 A1 May 16, 2019

(51) Int. Cl.
*G02B 6/42* (2006.01)

(52) U.S. Cl.
CPC .......... *G02B 6/4207* (2013.01); *G02B 6/423* (2013.01); *G02B 6/4206* (2013.01); *G02B 6/4214* (2013.01)

(58) Field of Classification Search
CPC .. G02B 6/4207; G02B 6/4206; G02B 6/4214; G02B 6/423
USPC .......................................................... 385/14
See application file for complete search history.

(56) References Cited

U.S. PATENT DOCUMENTS

| 6,014,271 | A  | * | 1/2000 | Uchida | ................ | G11B 7/1374 359/708 |
| 7,212,326 | B2 | * | 5/2007 | Wooten | ................... | G02F 1/225 359/237 |
| 2005/0169584 | A1 | * | 8/2005 | Takimoto | ............. | G02B 6/2746 385/78 |
| 2010/0316327 | A1 | * | 12/2010 | Montoya | ................ | B82Y 20/00 385/6 |
| 2012/0294565 | A1 | * | 11/2012 | Iida | ....................... | G02B 6/2746 385/14 |
| 2016/0109655 | A1 | * | 4/2016 | Vurgaftman | ........... | G02B 6/122 385/14 |
| 2017/0168248 | A1 | * | 6/2017 | Hayauchi | ............. | G02B 6/3839 |

* cited by examiner

*Primary Examiner* — Jerry M Blevins
(74) *Attorney, Agent, or Firm* — Patent Capital Group

(57) ABSTRACT

There is disclosed in one example a computing apparatus, including: a fiber-optic transmitter including a laser source; an input waveguide to receive a modulated laser pulse from the laser source; an output waveguide to direct the modulated laser pulse to an external communication element; and an isolator bridge optically coupled to the input waveguide and output waveguide, the isolator bridge including an input lens, an input-side folding prism, an isolator element, an output-side folding prism, and an output lens, wherein an input light pulse through the input lens is to be redirected by the input-side folding prism through the isolator element to the output-side folding prism, and redirected by the output-side folding prism through the output lens.

19 Claims, 10 Drawing Sheets

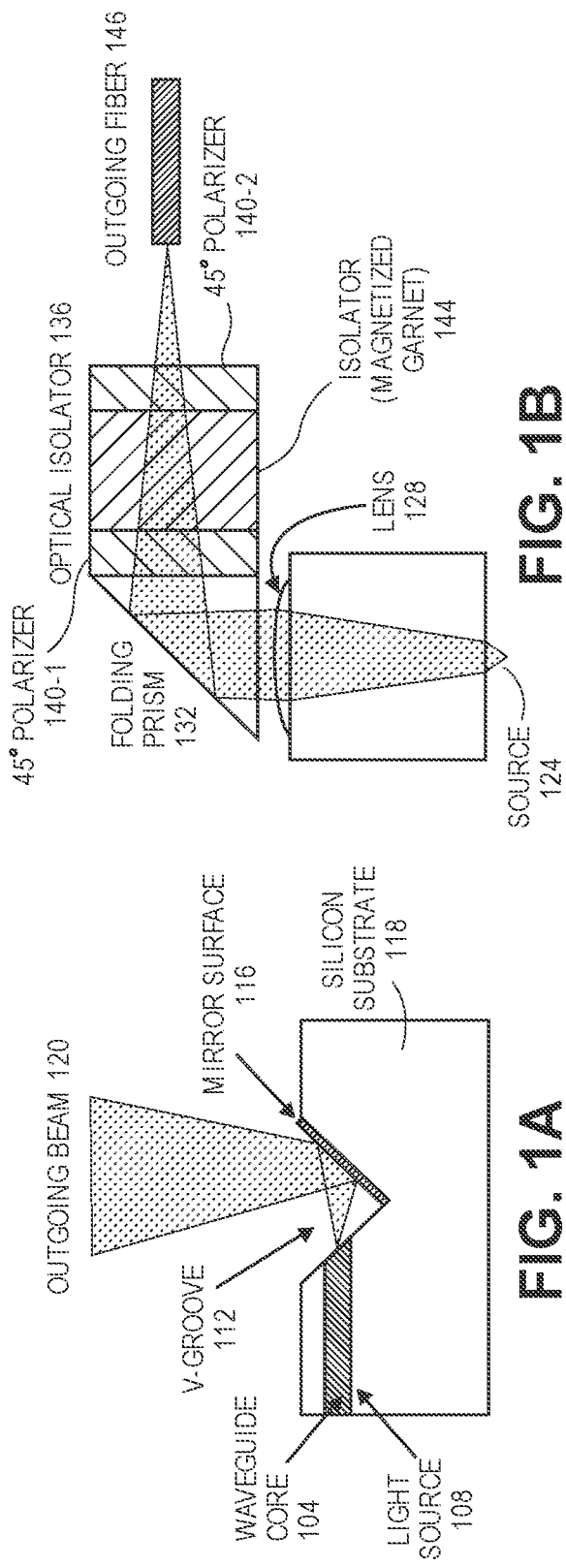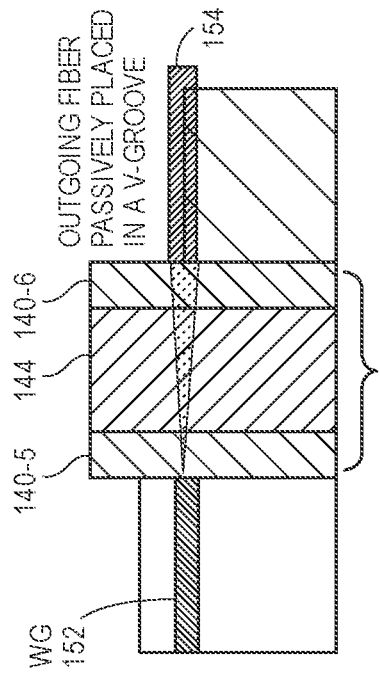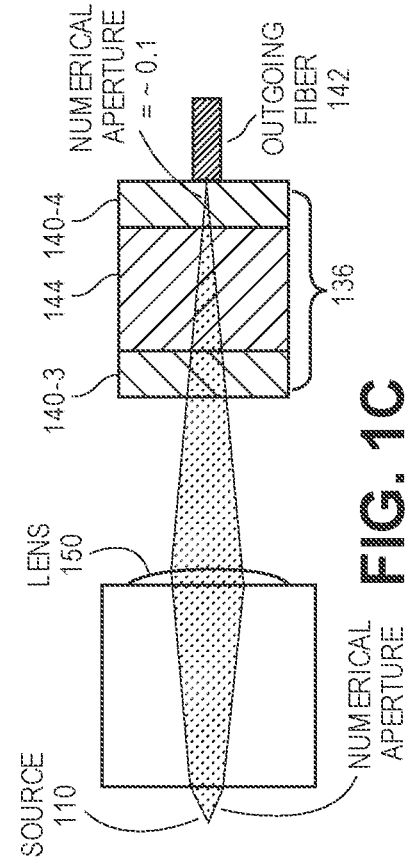

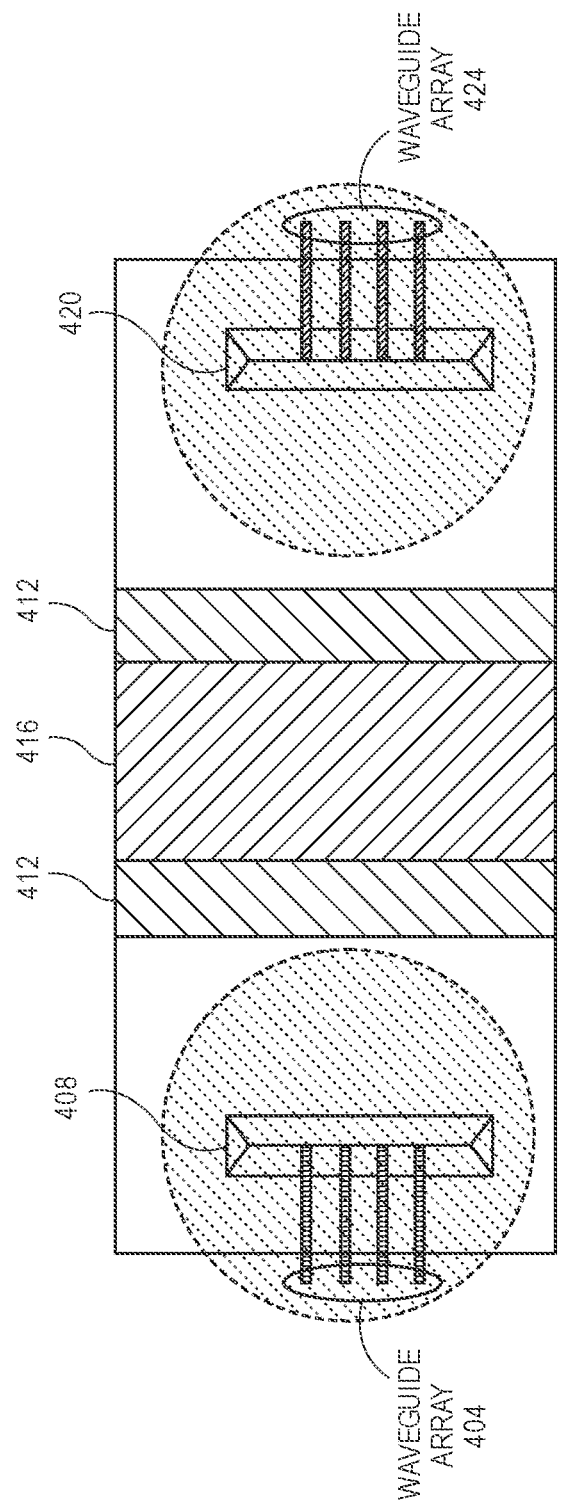

OPTICAL ISOLATOR BRIDGE

FIELD OF THE SPECIFICATION

This disclosure relates in general to the field of fiber-optic communication, and more particularly, though not exclusively, to a system for providing an optical isolator bridge.

BACKGROUND

Fiber-optic communication is a method of communicating information via modulated light pulses.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 1A-1D illustrate various emission schemes that can be used for coupling a fiber-optic source to a destination.

FIG. 4A illustrates an embodiment of an optical isolator bridge.

EMBODIMENTS OF THE DISCLOSURE

Figures 2A, 2B, 2C:
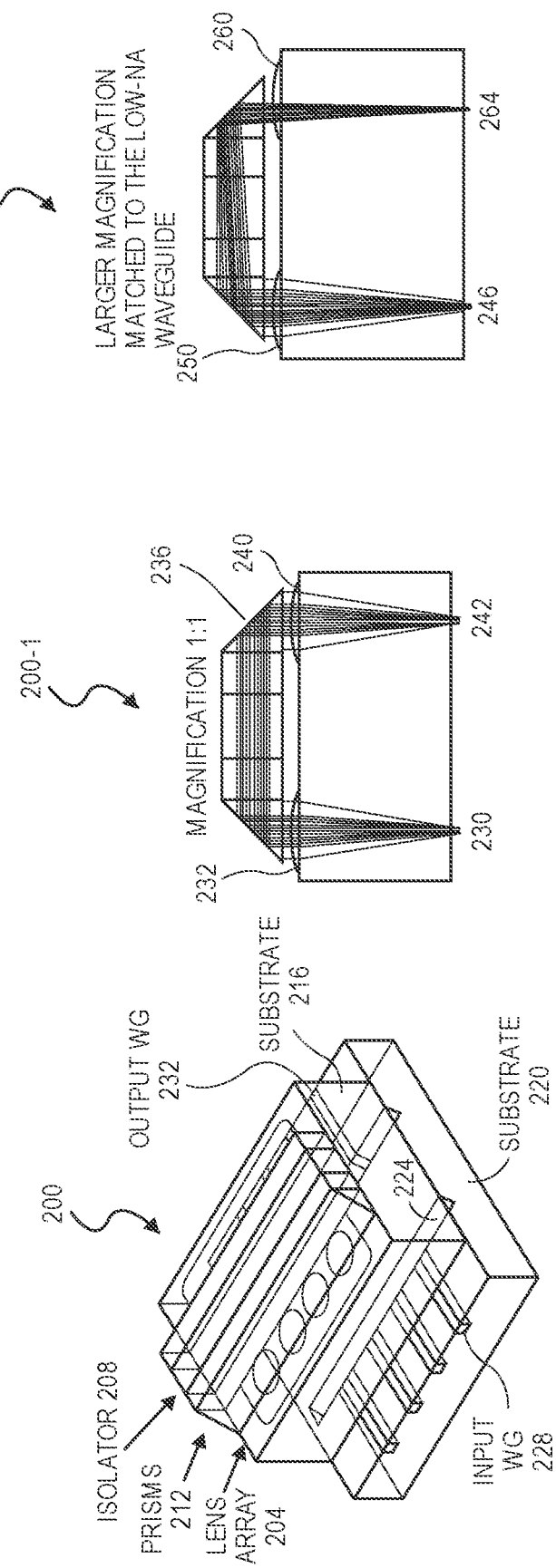
FIGS. 2A-2C illustrate embodiments of an optical isolator assembly.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples, or in some cases across different figures. This repetition is for the purpose of simplicity and clarity and does not in itself dictate a specific relationship between the various embodiments and/or configurations discussed. Different embodiments may have different advantages, and no particular advantage is necessarily required of any embodiment.

A contemporary computing platform may include a complex and multi-faceted hardware platform provided by Intel®, another vendor, or combinations of different hardware from different vendors. For example, a large data center such as may be provided by a cloud service provider (CSP), a high-performance computing (HPC) cluster, or a hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by flexibility to dynamically assign resources according to current workloads and needs. This can be accomplished, for example, by assigning a compute workload to a guest device, wherein resources such as hardware, storage, and networks are provided to a virtual machine, container, or disaggregated node by way of nonlimiting example.

In embodiments of the present disclosure, a processor includes any programmable logic device with an instruction set. Processors may be real or virtualized, local or remote, or in any other configuration. A processor may include, by way of nonlimiting example, an Intel® processor (e.g., Xeon®, Core™, Pentium®, Atom®, Celeron®, x86, or others). A processor may also include competing processors, such as AMD (e.g., Kx-series x86 workalikes, or Athlon, Opteron, or Epyc-series Xeon workalikes), ARM processors, or IBM PowerPC and Power ISA processors, to name just a few.

Isolators are necessary in many contemporary communication systems that use modulated pulses, particularly in fiber-optic systems that use modulated light pulses. Because the lasers that drive these communication channels are highly intolerant of reflections, optical isolators are used to ensure that light propagated from one interface to another interface does not reflect back. A typical isolator may include a first polarizer that linearly polarizes the incoming light, a layer of magnetized garnet, and a second polarizer that further polarizes the light by an angle such as 45° with respect to the first polarizer. After a laser pulse is passed through this isolator, any light that is reflected back may possibly pass through the first 45° polarizer that it encounters, but it is very unlikely to successfully pass through the second 45° polarizer. Thus, there is minimal to no reflection back to the light source.

Another concern in isolator design is the matching of numerical apertures. Common fiber-optic cables have numerical apertures on the order of approximately 0.1. However, the on-chip waveguide may emit light with a higher numerical aperture at approximately 0.3 to 0.4. Thus, the isolator assembly may also include a lens to refocus the light back down to the appropriate numerical aperture for the outgoing fiber-optic cable. If on-chip waveguides are successfully manufactured that have inherent matching numerical aperture to the fiber-optic cable, such a lens could be eliminated.

These types of isolators are commonly used on interconnects that carry light pulses between the fiber-optic chip and the larger silicon die. The silicon die then contains waveguides that further propagate the light pulses out to a connector, where the signals can be picked up by a fiber-optic cable and carried to other devices in the system.

Optical components such as fibers, lenses, and waveguides can be aligned with their host silicon blocks either actively or passively. In passive alignment, the position of the source waveguides is observed, and the position of the output waveguides is observed. The source waveguides and the isolator waveguides may be placed together in as near proximity as practical, and the isolator is affixed to the silicon with an adhesive such as an epoxy. While this manufacturing process is inexpensive, it also provides greater error margins, and the error experienced may be intolerable for some applications. It is, therefore, sometimes desirable to use an active alignment solution. In an active alignment solution, the isolator is placed on the silicon surface passively, but is not affixed to the surface. Light pulses are then sent through the isolator, and optical measurements are taken to determine the attenuation of the signals. The alignment can then be adjusted until an acceptable attenuation is realized. Only then are the two pieces epoxied.

The optical isolator bridge of the present specification can be used with either matched or mismatched numerical apertures, and can be used with either active or passive alignment. Advantageously, there may be fewer active alignment steps, even when active alignment is needed. In the optical isolator bridge of the present specification, the silicon chip includes both source and destination waveguides, with the optical isolator bridging the source and destination. Although the isolator bridge may need to be actively aligned with the chip, the chip may then be able to be passively aligned with the interface to the system via V-grooves that may be butt-coupled to the output waveguides.

The structure described herein addresses problems of butt-coupling of silicon chip waveguides to an array of fibers passively placed in their respective V-grooves while maintaining mutual optical isolation of the source and the output. In many existing systems, active alignment of the fibers or fiber arrays may be necessary with respect to the source. Besides mutual alignment of the source waveguides in the fibers, the beam may need to be extended to match the numerical aperture of the fiber. As noted above, silicon waveguides typically have a very small core size with a large numerical aperture, so an optical system or lens of magnification of three to four times may be necessary for the best coupling efficiency.

Many existing solutions have realized high integration potential in a vertical emission scheme (such as the one illustrated in FIG. 1A).

A system and method for providing an optical isolator bridge will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIGS. 1A-1D illustrate various emission schemes that can be used for coupling a fiber-optic source to a destination. Additionally, FIGS. 1A-1D illustrate various features of these couplings, and the principles illustrated herein may be used in conjunction with, or in addition to, those specifically taught in the isolator bridge of the present specification. Also note that some embodiments may use heterogeneous solutions, wherein the solutions illustrated in FIGS. 1A-1D are used on the same system with an isolator bridge such as that illustrated in FIG. 2A.

Many existing solutions realize high integration potential by using the vertical emission scheme illustrated in FIG. 1A. In this case, waveguide core 104 provides a light source 108, which is launched into a V-groove 112. A mirror surface 116 rotates light approximately 90° into outgoing beam 120. V-groove 112 may be etched into silicon substrate 118. The light from light source 108 is reflected to a vertical direction from the metallized side of the V-groove.

FIG. 1B illustrates a typical application that uses a species of vertical launching. In this case, source 124 passes through lens 128 into folding prism 132. An isolator 144 (constructed, for example, of magnetized garnet) is sandwiched between two 45° polarizers 140-1 and 140-2, respectively. Lens 128 appropriately focuses the light beam so that it arrives at outgoing fiber 146, at the appropriate numerical aperture. In other words, the divergent light undergoes focusing to ensure numerical aperture matching.

In FIG. 1C, light exits from an edge of the chip and passes through a lens and isolator without any folding. Specifically, source 110 has a numerical aperture of approximately 0.3 to approximately 0.4. Outgoing fiber 142 has a numerical aperture of approximately 0.1. Therefore, lens 150 may provide a magnification of approximately three to four times. As before, there is an isolator assembly including a magnetized garnet isolator 144 sandwiched between two 45° polarizers 140-3 and 140-4, respectively. There is no folding prism, so there is no change in direction for the light pulse as it hits outgoing fiber 142.

FIG. 1D illustrates a scheme that relies on passive placement of the fibers with respect to the waveguides. In this case, waveguide 152 has a numerical aperture that appropriately matches the numerical aperture of outgoing fiber 154, which is placed in a V-groove. Again, there is an isolator assembly 136, including a sheet of magnetized garnet 144 sandwiched between 45° polarizers 140-5 and 140-6, respectively.

For this configuration to work, the silicon waveguide needs to be extended to a small numerical aperture on-chip.

Note that both vertical emission and edge emission are used commercially as of this writing. Both solutions require active alignment of a fiber block. Not only is active alignment more expensive than passive alignment as a manufacturing process, but any stress imposed on the fibers, or shifts caused by epoxy cure or thermal expansion coefficient mismatch between the materials, can affect coupling efficiency. This can reduce the yield and cause failure of the products after sale.

FIGS. 2A-2C illustrate embodiments of an optical isolator assembly 200. FIG. 2A illustrates assembly 200, which provides a generic structure, while FIG. 2B illustrates assembly 200-1, which has a one-to-one magnification. This can be used in cases where the numerical aperture of the source matches the numerical aperture of the destination. FIG. 2C illustrates assembly 200-2, with larger magnification to match a higher numerical aperture waveguide to a low numerical aperture waveguide or fiber-optic cable.

Referring to FIG. 2A, optical isolator bridge 200 is a small structure including an array of lenses 204, an optical isolator 208, and folding prisms 212. Isolator bridge 200 may be manufactured separately from silicon substrate 220 of the fiber-optic chip. However, isolator bridge 200 is also built on a silicon substrate 216, and may be constructed using common lithography techniques. Isolator bridge 200 has a predefined array of vertical emission or entrance points that interface with substrate 200 at V-grooves 224, which reflect light from waveguides 228. The light taken from the chip undergoes optical isolation, and optionally magnification, and is then redirected to output waveguides 232 on the same chip. The output waveguides may be of low numerical aperture, so that they can be directly butt-coupled to an array of fibers.

Advantageously, because substrate 216 and substrate 220 are the same material, there is no differential in their thermal expansion coefficient, and therefore if thermal expansion does occur, it should not cause any misalignment of the waveguides. While isolator bridge 200 may need to be actively aligned with substrate 220, the low numerical aperture output waveguides may be able to be passively aligned with an array of optical fibers. The passive alignment may result in some distortion or attenuation, but any error that occurs as a result may be tolerable.

FIG. 2B illustrates an embodiment of an optical isolator bridge 200-1 that uses one-to-one magnification. In this case, light diverges from source 230 and passes through a lens 232. The light then passes through the isolator bridge assembly 236, and to another lens 240 with the same magnification factor as lens 232. Thus, light arrives at destination 242 with the same numerical aperture as when it departs from source 230. This is useful in a situation where a low numerical aperture waveguide input and output are able to be manufactured.

If it is not practical or desirable to manufacture a low numerical aperture waveguide at the source or destination end, then larger magnification may be used to match the low numerical aperture waveguide to the high numerical aperture waveguide. In this case, light goes from source 246 to lens 250, then passes through isolator bridge assembly 254, then to lens 260, and finally to destination 264. In this case, lenses 250 and 260 do not have the same magnification factor, and thus, magnification is provided between source 246 and destination 264 to provide numerical aperture matching.

Advantageously, both optical isolation and beam expansion occur within the chip with the use of the isolator bridge of the present specification. This improves the prospect of system integration. The small structure (the isolator bridge) affixed or glued to the silicon chip is stress-free and, if based on silicon lens arrays, is perfectly thermally matched to the chip itself. This reduces the probability of post-cure shifts. A passively placed array of output fibers in their respective V-grooves may be butt-coupled to the output waveguides.

Figure 3C:
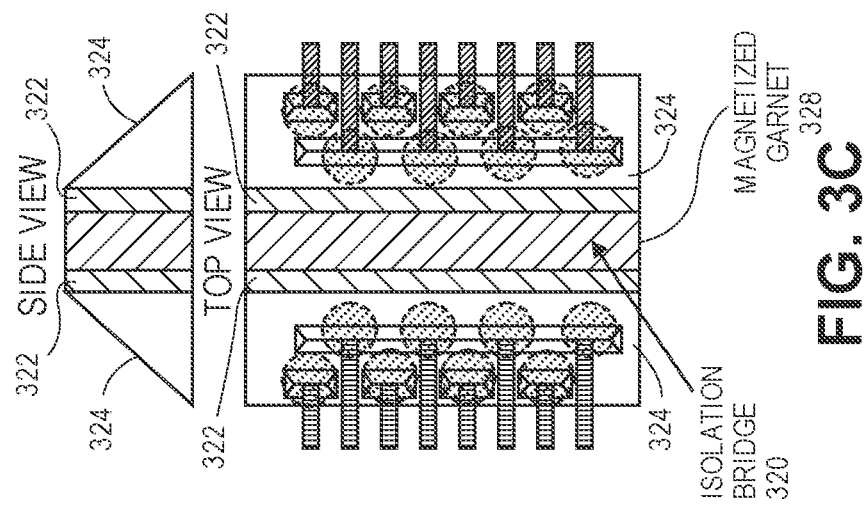
FIGS. 3A-3C illustrate structural details of an optical isolator bridge.
Figure 3B:
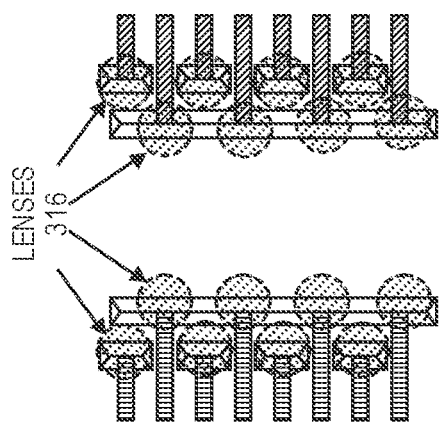
Figure 3A:
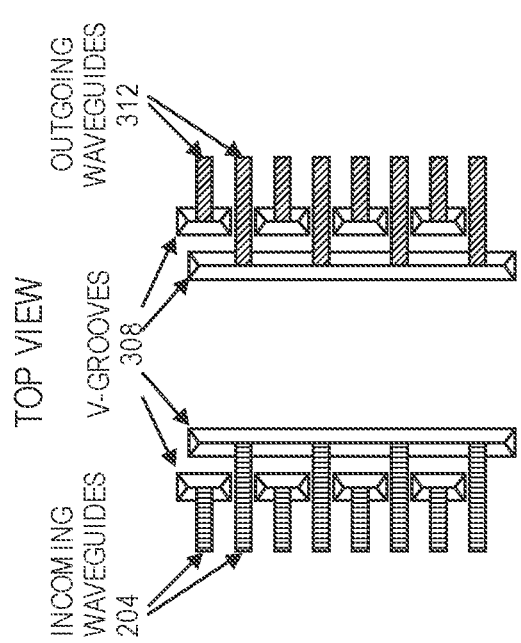

FIGS. 3A-3C illustrate additional structural details of an optical isolator bridge. In an optical isolator bridge, a waveguide or waveguide array is interrupted with vertical exit and entrance points, as shown in FIG. 3A. Exiting light is collimated and passed through an optical isolator attached at the top of the lens chip using a pair of 45° prisms, and then refocused to the waveguide entrance point. A pair (or an array) of identical lenses can be used for collimation and focusing, simplifying the manufacturing process. Alternatively, an array of focusing lenses may be placed only on one side of the bridge to ensure non-unity magnification for different numerical aperture matching. Two sets of non-identical lenses on both sides of the bridge may be used for the same purpose.

A Zemax simulation of an embodiment of an optical isolator bridge of the present specification predicts over 98% nominal coupling efficiency of the system. While some of the foregoing FIGURES show two sets of lenses arranged in linear arrays, other embodiments include sets of lenses arranged in two or more rows on both sides. This is illustrated in FIGS. 3A-3C. In this case, incoming waveguides 304 interface with V-grooves 308, which themselves interface with outgoing waveguides 312.

As illustrated in FIG. 3B, lenses 316 may be placed at each juncture. The isolator bridge 320 can then be built on top of the array of waveguides, V-grooves, and lenses. As before, isolator bridge 320 includes polarizers 322 and folding prisms 324, and magnetized garnet 328 or other isolator material may be used.

Note that FIG. 3C illustrates both a top view and a side view of the isolator assembly.

FIG. 4A illustrates an embodiment of an optical isolator bridge that includes a scheme where multiple waveguides are serviced by a single lens. Specifically, waveguide array 404 is serviced by a single lens 408. As before, the isolator bridge includes polarizers 412 and isolator 416. Light passes to output lens 420, which services waveguide array 424.

Figure 4B:
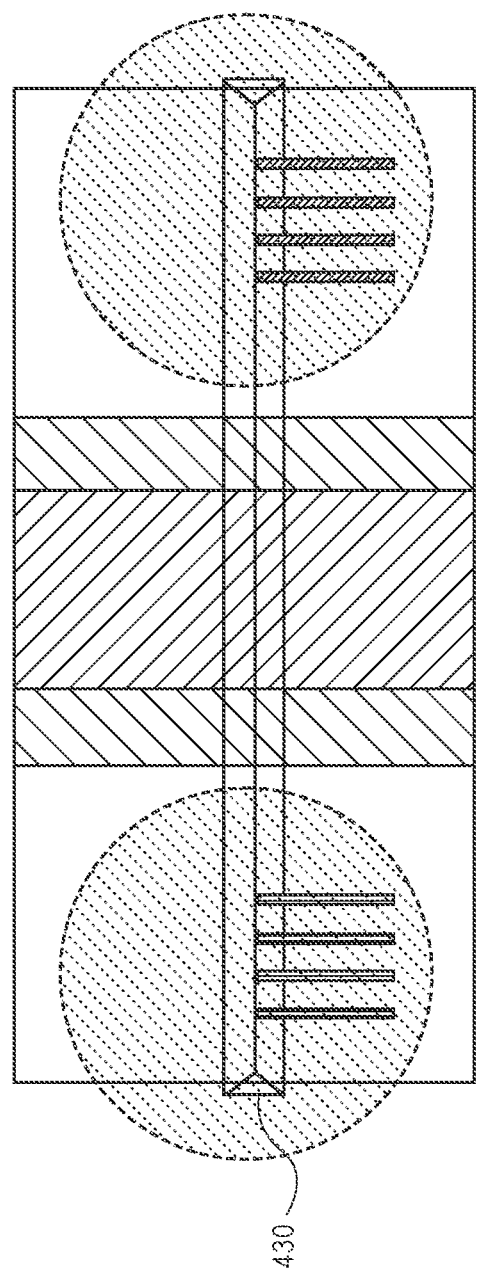
FIG. 4B illustrates an optical isolator bridge that is rotated by 90°.

FIG. 4B illustrates that, if the optical isolator bridge is rotated by 90°, the input and output waveguide arrays can share a common vertical emission trench 430. The input and output waveguides are parallel in this configuration, so the waveguides in one of the sets, or both, may need to be "bent" to redirect light to the fiber array. A 90° rotation of the bridge is also possible for a configuration with lenses centered to emission or exit points, such as those illustrated in FIGS. 2 and 3.

Figure 5B:
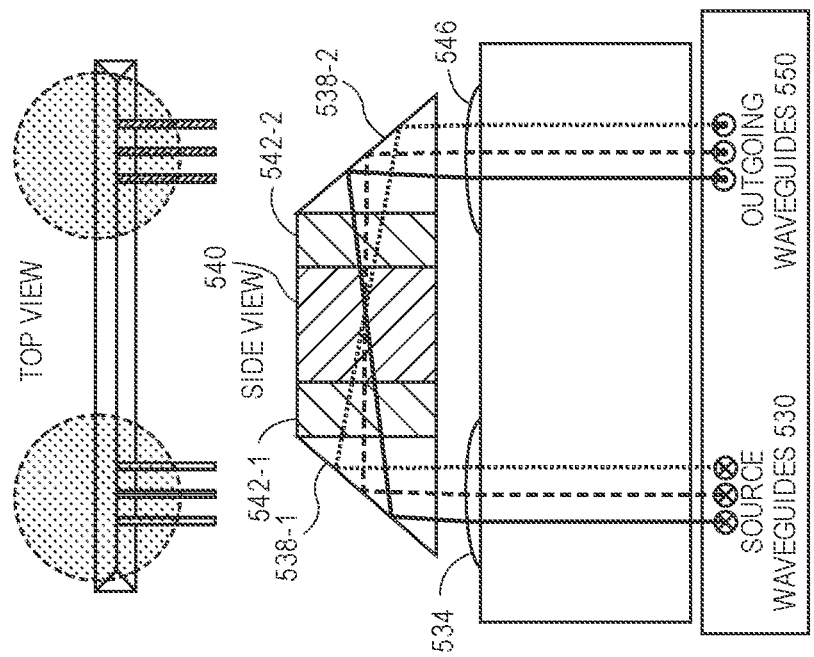
FIGS. 5A and 5B illustrate an embodiment in which a single V-groove configuration is possible.
Figure 5A:
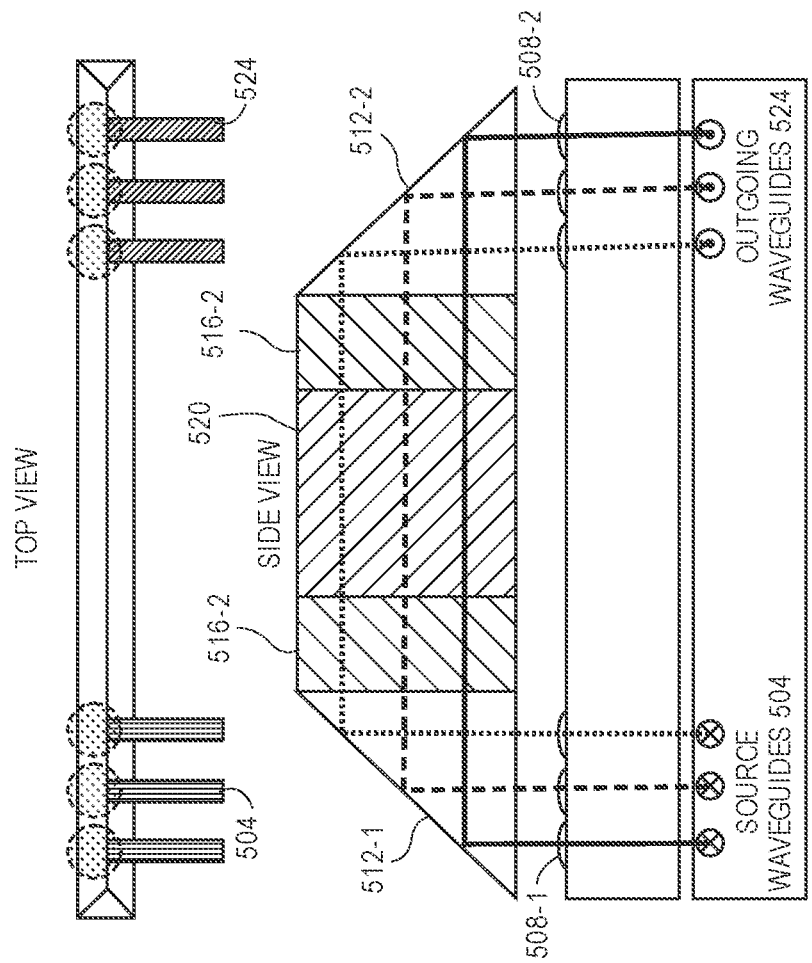

FIGS. 5A and 5B illustrate an embodiment in which a single V-groove configuration is possible. FIG. 5A shows the chief ray directions in the "one waveguide, one lens" configuration. Specifically, source waveguides 504 each have a dedicated lens 508-1. Light beams then pass through folding prism 512-1, through 45° polarizer 516-1, isolator 520, polarizer 516-2, folding prism 512-2, dedicated lenses 508-2, then down to outgoing waveguides 524. FIG. 5B illustrates an embodiment in which multiple waveguides pass through a single lens. Specifically, source waveguides 530 send pulses through lens 534 to folding prism 538-1. The beams then pass through polarizer 542-1, isolator 540, polarizer 542-2, and folding prism 538-2. The beams then continue through lens 546 to outgoing waveguides 550. Note that in this case, the ordering of outgoing waveguides is reversed, because the light pulses experience reversal within folding prisms 538, which reflect the pulses at a non-right angle. This permits the use of a single lens for multiple waveguides. Note that in the FIGURES, waveguide spacing and refraction angles are significantly exaggerated for clarity.

The isolator bridge of the present specification realizes numerous advantages. First, the isolator is inserted in-house at the chip level. The outgoing waveguides can then be butt-coupled to the fibers.

The isolator bridge is also simple and robust. Some embodiments provide one-to-one magnification with symmetric structure, resulting in over 98% nominal coupling efficiency. Furthermore, the isolator bridge provides identical collimation, and focusing lenses can be formed as part of a single array. Collimated beams between the lenses are tolerant to beam displacement due to tolerances in the element thickness.

As a manufacturing advantage, lithographically-controlled pitch can be realized between the lenses. This can be made to match the exact gap between the interrupted waveguide ends. The lens array can be made of silicon, matching the chip thermal expansion coefficient, resulting in stress-free operation for good long-term reliability.

Furthermore, the solution can be extended to any suitable magnification value, thus enabling low numerical aperture solutions for matching with magnifications of approximately three to four times, or other magnification values. Additionally, a small isolator bridge can serve multiple channels, thus further reducing cost.

Figure 6:
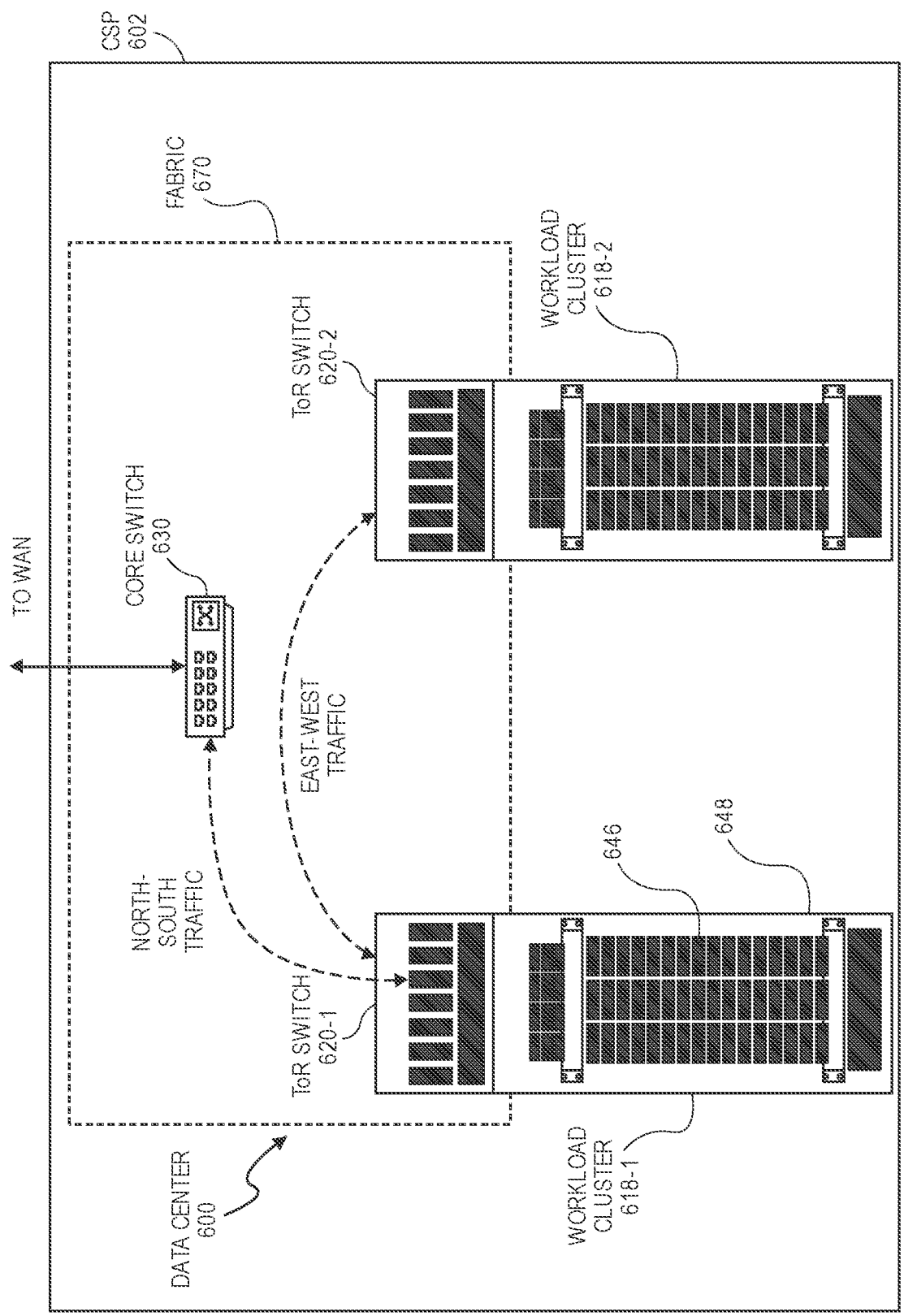
FIG. 6 is a block diagram of selected components of a data center with network connectivity.

FIG. 6 is a block diagram of selected components of a data center 600 with network connectivity. Embodiments of data center 600 disclosed herein may be adapted or configured to provide an optical isolator bridge, according to the teachings of the present specification. Data center 600 is disclosed in this illustration as a data center operated by a CSP 602, but this is an illustrative example only. The principles illustrated herein may also be applicable to an HPC cluster, a smaller "edge" data center, a microcloud, or other interconnected compute structure.

CSP 602 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 602 may provide, instead of or in addition to cloud services, HPC platforms or services. Indeed, while not expressly identical, HPC clusters ("supercomputers") may be structurally similar to cloud data centers, and unless expressly specified, the teachings of this specification may be applied to either. In general usage, the "cloud" is considered to be separate from an enterprise data center. Whereas an enterprise data center may be owned and operated on-site by an enterprise, a CSP provides third-party compute services to a plurality of "tenants." Each tenant may be a separate user or enterprise, and may have its own allocated resources, SLAs, and similar.

CSP 602 may provision some number of workload clusters 618, which may be clusters of individual servers, blade servers, rackmount servers, or any other suitable server topology. In this illustrative example, two workload clusters, 618-1 and 618-2 are shown, each providing rackmount servers 646 in a chassis 648.

In this illustration, workload clusters 618 are shown as modular workload clusters conforming to the rack unit ("U") standard, in which a standard rack, 19 inches wide, may accommodate up to 42 units (42U), each 1.75 inches high and approximately 36 inches deep. In this case, compute resources such as processors, memory, storage, accelerators, and switches may fit into some multiple of rack units from 1 U to 42 U.

Figure 9:
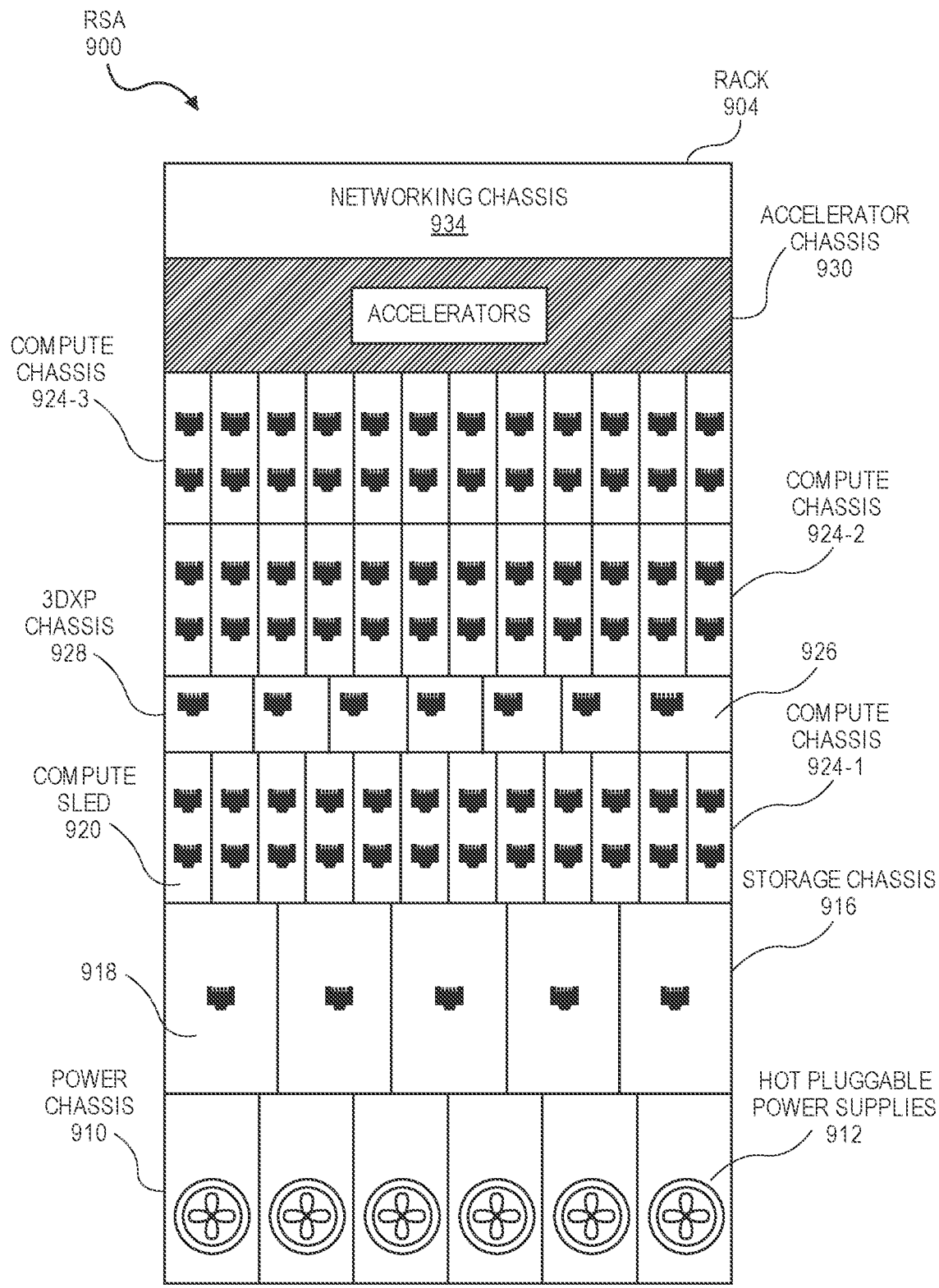
FIG. 9 is a block diagram of rack scale design.

However, other embodiments are also contemplated. For example, FIG. 9 illustrates rack scale design (RSD). In RSD, a rack may be built according to the standard 42U dimensions, but it may be configured to accommodate line-replaceable units (LRUs) in compute "sleds." In RSD, a sled chassis may or may not be built according to standard rack units. For example, a sled to accommodate processors may fit in a standard 3U configuration, or it may be of an arbitrary size according to preferential design considerations. In RSD, entire pre-populated racks of resources may be provided as a unit, with the rack hosting a plurality of resource sleds, containing such elements as compute (e.g., processors), memory, storage, accelerators, power, networking, and others. Each sled chassis may accommodate a number of LRUs, each embodied in an individual sled. If a resource fails, the LRU hosting that resource can be pulled, and a new one can be modularly inserted. The failed LRU can then be repaired or discarded, depending on the nature of the failure. RSD is especially, though not exclusively, beneficial in the case of software-defined infrastructure (SDI), wherein composite nodes may be built from disaggregated resources. Large resource pools can be provided, and an SDI orchestrator may allocate them to composite nodes as necessary.

In the case of a more traditional rack-based data center, each server 646 may host a standalone operating system and provide a server function, or servers may be virtualized, in which case they may be under the control of a virtual machine manager (VMM), hypervisor, and/or orchestrator. Each server may then host one or more virtual machines, virtual servers, or virtual appliances. These server racks may be collocated in a single data center, or may be located in different geographic data centers. Depending on contractual agreements, some servers 646 may be specifically dedicated to certain enterprise clients or tenants, while others may be shared.

The various devices in a data center may be connected to each other via a switching fabric 670, which may include one or more high speed routing and/or switching devices. Switching fabric 670 may provide both "north-south" traffic (e.g., traffic to and from the wide area network (WAN), such as the Internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 646 increases, traffic volume may further increase. For example, each server 646 may provide multiple processor slots, with each slot accommodating a processor having four to eight cores, along with sufficient memory for the cores. Thus, each server may host a number of virtual machines (VMs), each generating its own traffic.

To accommodate the large volume of traffic in a data center, a highly capable switching fabric 670 may be provided. As used throughout this specification, a "fabric" should be broadly understood to include any combination of physical interconnects, protocols, media, and support resources that provide communication between one or more first discrete devices and one or more second discrete devices. Fabrics may be one-to-one, one-to-many, many-to-one, or many-to-many.

In some embodiments, fabric 670 may provide communication services on various "layers," as outlined in the Open Systems Interconnection (OSI) seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Switching fabric 670 is illustrated in this example as a "flat" network, wherein each server 646 may have a direct connection to a top-of-rack (ToR) switch 620 (e.g., a "star" configuration). Note that ToR is a common and historical name, and ToR switch 620 may, in fact, be located anywhere on the rack. Some data centers place ToR switch 620 in the middle of the rack to reduce the average overall cable length.

Each ToR switch 620 may couple to a core switch 630. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 646 may include an Intel® Host Fabric Interface (HFI), a network interface card (NIC), intelligent NIC (iNIC), smart NIC, a host channel adapter (HCA), or other host interface. For simplicity and unity, these may be referred to throughout this specification as a "fabric adapter" (FA), which should be broadly construed as an interface to communicatively couple the host to the data center fabric. The FA may couple to one or more host processors via an interconnect or bus, such as PCI, PCIe, or similar, referred to herein as a "local fabric." Multiple processors may communicate with one another via a special interconnects such as a core-to-core Ultra Path Interconnect (UPI), Infinity Fabric, etc. Generically, these interconnects may be referred to as an "inter-processor fabric." The treatment of these various fabrics may vary from vendor to vendor and from architecture to architecture. In some cases, one or both of the local fabric and the inter-processor fabric may be treated as part of the larger data center fabric 672. Some FAs have the capability to dynamically handle a physical connection with a plurality of protocols (e.g., either Ethernet or PCIe, depending on the context), in which case PCIe connections to other parts of a rack may usefully be treated as part of fabric 672. In other embodiments, PCIe is used exclusively within a local node, sled, or sled chassis, in which case it may not be logical to treat the local fabric as part of data center fabric 672. In yet other embodiments, it is more logically to treat the inter-processor fabric as part of the secure domain of the processor complex, and thus treat it separately from the local fabric and/or data center fabric 672. In particular, the inter-processor fabric may be cache and/or memory-coherent, meaning that coherent devices can map to the same memory address space, with each treating that address space as its own local address space. Many data center fabrics and local fabrics lack coherency, and so it may be beneficial to treat inter-processor fabric, the local fabric, and the data center fabric as one cohesive fabric, or two or three separate fabrics. Furthermore, the illustration of three levels of fabric in this example should not be construed to exclude more or fewer levels of fabrics, or the mixture of other kinds of fabrics. For example, many data centers use copper interconnects for short communication distances, and fiber-optic interconnects for longer distances.

Thus, fabric 670 may be provided by a single interconnect or a hybrid interconnect, such as where PCIe provides on-chip (for a system-on-a-chip) or on-board communication, 1 Gb or 10 Gb copper Ethernet provides relatively short connections to a ToR switch 620, and optical cabling provides relatively longer connections to core switch 630. Interconnect technologies that may be found in the data center include, by way of nonlimiting example, Intel® Silicon Photonics, an Intel® HFI, a NIC, intelligent NIC (iNIC), smart NIC, an HCA or other host interface, PCI, PCIe, a core-to-core UPI (formerly called QPI or KTI), Infinity Fabric, Intel® Omni-Path™ Architecture (OPA), TrueScale™, FibreChannel, Ethernet, FibreChannel over Ethernet (FCoE), InfiniBand, a legacy interconnect such as a local area network (LAN), a token ring network, a synchronous optical network (SONET), an asynchronous transfer mode (ATM) network, a wireless network such as Wi-Fi or Bluetooth, a "plain old telephone system" (POTS) interconnect or similar, a multi-drop bus, a mesh interconnect, a point-to-point interconnect, a serial interconnect, a parallel bus, a coherent (e.g., cache coherent) bus, a layered protocol architecture, a differential bus, or a Gunning transceiver logic (GTL) bus, to name just a few. The fabric may be cache- and memory-coherent, cache and memory non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in HPC applications, while Ethernet and Fibre-Channel are more popular in cloud data centers. But these examples are expressly nonlimiting, and as data centers evolve fabric technologies similarly evolve.

Note that while high-end fabrics such as OPA are provided herein by way of illustration, more generally, fabric 670 may be any suitable interconnect or bus for the particular application. This could, in some cases, include legacy interconnects like LANs, token ring networks, synchronous optical networks (SONET), ATM networks, wireless networks such as Wi-Fi and Bluetooth, POTS interconnects, or similar. It is also expressly anticipated that in the future, new network technologies may arise to supplement or replace some of those listed here, and any such future network topologies and technologies can be or form a part of fabric 670.

Figure 7:
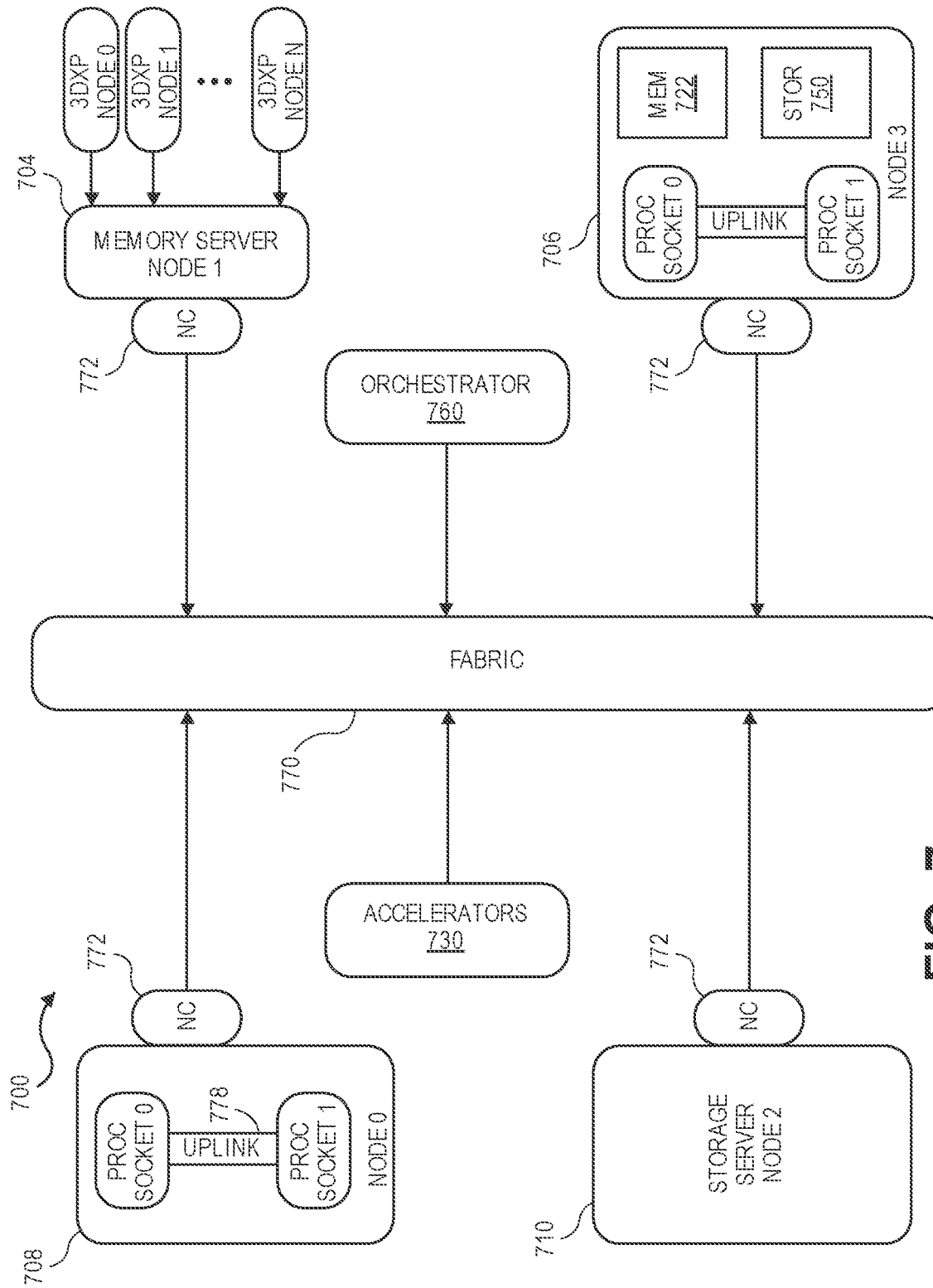
FIG. 7 is a block diagram of selected components of an end-user computing device.

FIG. 7 is a block diagram of an end-user computing device 700. Embodiments of computing device 700 disclosed herein may be adapted or configured to provide an optical isolator bridge, according to the teachings of the present specification. As above, computing device 700 may provide, as appropriate, cloud service, HPC, telecommunication services, enterprise data center services, or any other compute services that benefit from a computing device 700.

In this example, a fabric 770 is provided to interconnect various aspects of computing device 700. Fabric 770 may be the same as fabric 670 of FIG. 6, or may be a different fabric. As above, fabric 770 may be provided by any suitable interconnect technology. In this example, Intel® Omni-Path™ is used as an illustrative and nonlimiting example.

As illustrated, computing device 700 includes a number of logic elements forming a plurality of nodes. It should be understood that each node may be provided by a physical server, a group of servers, or other hardware. Each server may be running one or more virtual machines as appropriate to its application.

Node 0 708 is a processing node including a processor socket 0 and processor socket 1. The processors may be, for example, Intel® Xeon™ processors with a plurality of cores, such as 4 or 8 cores. Node 0 708 may be configured to provide network or workload functions, such as by hosting a plurality of virtual machines or virtual appliances.

On-board communication between processor socket 0 and processor socket 1 may be provided by an on-board uplink 778. This may provide a very high speed, short-length interconnect between the two processor sockets, so that virtual machines running on node 0 708 can communicate with one another at very high speeds. To facilitate this communication, a virtual switch (vSwitch) may be provisioned on node 0 708, which may be considered to be part of fabric 770.

Node 0 708 connects to fabric 770 via a network controller (NC) 772. NC 772 provides physical interface (a PHY level) and logic to communicatively couple a device to a fabric. For example, NC 772 may be a NIC to communicatively couple to an Ethernet fabric or an HFI to communicatively couple to a clustering fabric such as an Intel® Omni-Path™, by way of illustrative and nonlimiting example. In some examples, communication with fabric 770 may be tunneled, such as by providing UPI tunneling over Omni-Path™.

Because computing device 700 may provide many functions in a distributed fashion that in previous generations were provided on-board, a highly capable NC 772 may be provided. NC 772 may operate at speeds of multiple gigabits per second, and in some cases may be tightly coupled with node 0 708. For example, in some embodiments, the logic for NC 772 is integrated directly with the processors on a system-on-a-chip (SoC). This provides very high speed communication between NC 772 and the processor sockets, without the need for intermediary bus devices, which may introduce additional latency into the fabric. However, this is not to imply that embodiments where NC 772 is provided over a traditional bus are to be excluded. Rather, it is expressly anticipated that in some examples, NC 772 may be provided on a bus, such as a PCIe bus, which is a serialized version of PCI that provides higher speeds than traditional PCI. Throughout computing device 700, various nodes may provide different types of NCs 772, such as on-board NCs and plug-in NCs. It should also be noted that certain blocks in an SoC may be provided as IP blocks that can be "dropped" into an integrated circuit as a modular unit. Thus, NC 772 may in some cases be derived from such an IP block.

Note that in "the network is the device" fashion, node 0 708 may provide limited or no on-board memory or storage. Rather, node 0 708 may rely primarily on distributed services, such as a memory server and a networked storage server. On-board, node 0 708 may provide only sufficient memory and storage to bootstrap the device and get it communicating with fabric 770. This kind of distributed architecture is possible because of the very high speeds of contemporary data centers, and may be advantageous because there is no need to over-provision resources for each node. Rather, a large pool of high speed or specialized memory may be dynamically provisioned between a number of nodes, so that each node has access to a large pool of resources, but those resources do not sit idle when that particular node does not need them.

In this example, a node 1 memory server 704 and a node 2 storage server 710 provide the operational memory and storage capabilities of node 0 708. For example, memory server node 1 704 may provide remote direct memory access (RDMA), whereby node 0 708 may access memory resources on node 1 704 via fabric 770 in a direct memory access fashion, similar to how it would access its own on-board memory. The memory provided by memory server 704 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is non-volatile.

Similarly, rather than providing an on-board hard disk for node 0 708, a storage server node 2 710 may be provided. Storage server 710 may provide a networked bunch of disks (NBOD), PFM, redundant array of independent disks (RAID), redundant array of independent nodes (RAIN), network-attached storage (NAS), optical storage, tape drives, or other non-volatile memory solutions.

Thus, in performing its designated function, node 0 708 may access memory from memory server 704 and store results on storage provided by storage server 710. Each of these devices couples to fabric 770 via an NC 772, which provides fast communication that makes these technologies possible.

By way of further illustration, node 3 706 is also depicted. Node 3 706 also includes an NC 772, along with two processor sockets internally connected by an uplink. However, unlike node 0 708, node 3 706 includes its own on-board memory 722 and storage 750. Thus, node 3 706 may be configured to perform its functions primarily on-board, and may not be required to rely upon memory server 704 and storage server 710. However, in appropriate circumstances, node 3 706 may supplement its own on-board memory 722 and storage 750 with distributed resources similar to node 0 708.

Computing device 700 may also include accelerators 730. These may provide various accelerated functions, including hardware or co-processor acceleration for functions such as packet processing, encryption, decryption, compression, decompression, network security, or other accelerated functions in the data center. In some examples, accelerators 730 may include deep learning accelerators that may be directly attached to one or more cores in nodes such as node 0 708 or node 3 706. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

In other embodiments, an accelerator could also be provided as an application-specific integrated circuit (ASIC), field-programmable gate array (FPGA), co-processor, graphics processing unit (GPU), digital signal processor (DSP), or other processing entity, which may optionally be tuned or configured to provide the accelerator function.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), PFM (e.g., Intel® 3D Crosspoint™), external storage, RAID, RAIN, NAS, optical storage, tape drive, backup system, cloud storage, or any combination of the foregoing by way of nonlimiting example. Such a medium could also include instructions programmed into an FPGA, or encoded in hardware on an ASIC or processor.

Figure 8:
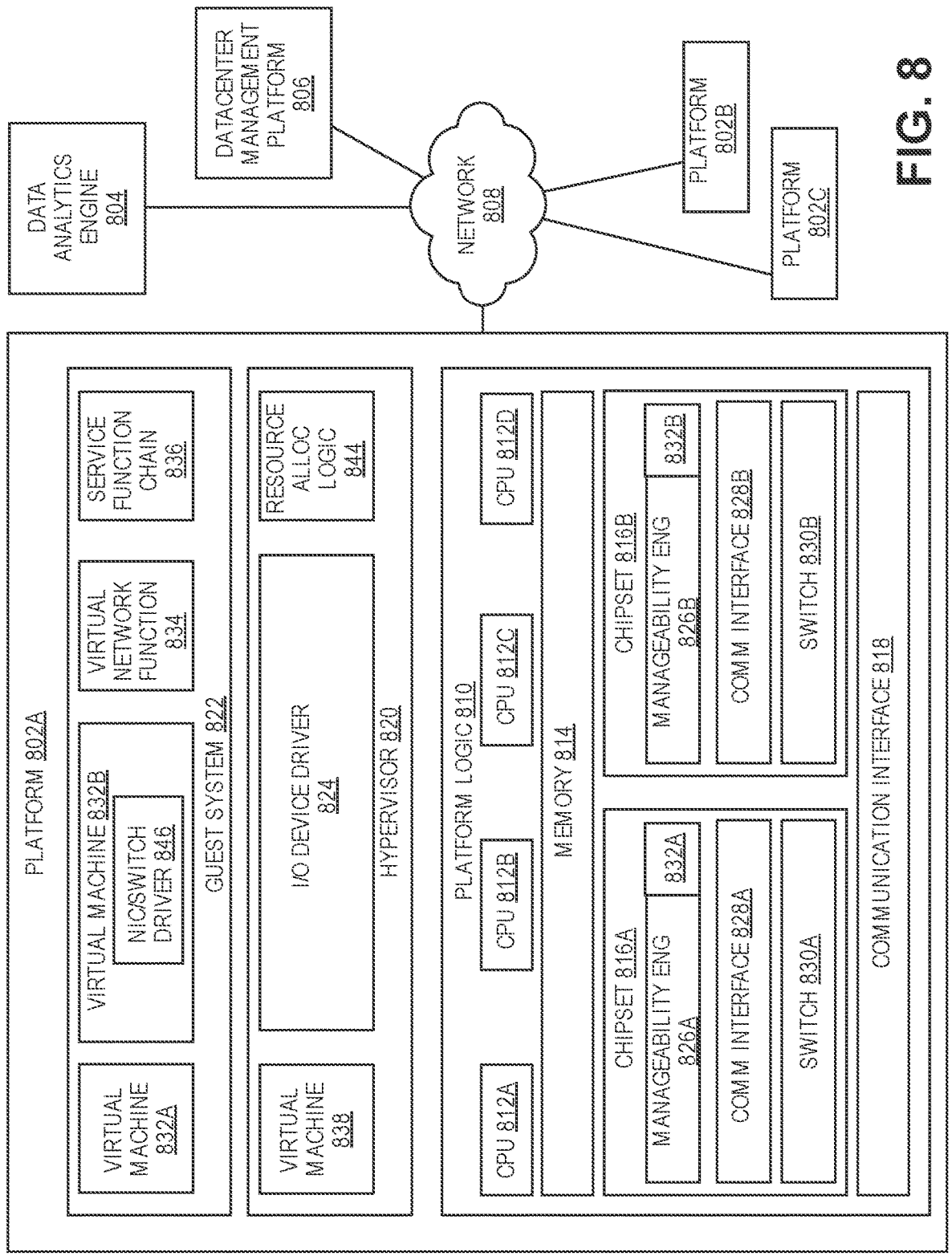
FIG. 8 is a block diagram of components of a computing platform.

FIG. 8 is a block diagram of components of a computing platform 802A. Embodiments of computing platform 802A disclosed herein may be adapted or configured to provide an optical isolator bridge, according to the teachings of the present specification.

In the embodiment depicted, hardware platforms 802A, 802B, and 802C, along with a data center management platform 806 and data analytics engine 804 are interconnected via network 808. In other embodiments, a computer system may include any suitable number of (i.e., one or more) platforms, including hardware, software, firmware, and other components. In some embodiments (e.g., when a computer system only includes a single platform), all or a portion of the system management platform 806 may be included on a platform 802. A platform 802 may include platform logic 810 with one or more central processing units (CPUs) 812, memories 814 (which may include any number of different modules), chipsets 816, communication interfaces 818, and any other suitable hardware and/or software to execute a hypervisor 820 or other operating system capable of executing workloads associated with applications running on platform 802. In some embodiments, a platform 802 may function as a host platform for one or more guest systems 822 that invoke these applications. Platform 802A may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 806, hypervisor 820, or other operating system) of computer platform 802A may assign hardware resources of platform logic 810 to perform workloads in accordance with the stress information. In some embodiments, self-diagnostic capabilities may be combined with the stress monitoring to more accurately determine the health of the hardware resources. Each platform 802 may include platform logic 810. Platform logic 810 comprises, among other logic enabling the functionality of platform 802, one or more CPUs 812, memory 814, one or more chipsets 816, and communication interfaces 828. Although three platforms are illustrated, computer platform 802A may be interconnected with any suitable number of platforms. In various embodiments, a platform 802 may reside on a circuit board that is installed in a chassis, rack, or other suitable structure that comprises multiple platforms coupled together through network 808 (which may comprise, e.g., a rack or backplane switch).

CPUs 812 may each comprise any suitable number of processor cores and supporting logic (e.g., uncores). The cores may be coupled to each other, to memory 814, to at least one chipset 816, and/or to a communication interface 818, through one or more controllers residing on CPU 812 and/or chipset 816. In particular embodiments, a CPU 812 is embodied within a socket that is permanently or removably coupled to platform 802A. Although four CPUs are shown, a platform 802 may include any suitable number of CPUs.

Memory 814 may comprise any form of volatile or non-volatile memory including, without limitation, magnetic media (e.g., one or more tape drives), optical media, random access memory (RAM), ROM, flash memory, removable media, or any other suitable local or remote memory component or components. Memory 814 may be used for short, medium, and/or long-term storage by platform 802A. Memory 814 may store any suitable data or information utilized by platform logic 810, including software embedded in a computer-readable medium, and/or encoded logic incorporated in hardware or otherwise stored (e.g., firmware). Memory 814 may store data that is used by cores of CPUs 812. In some embodiments, memory 814 may also comprise storage for instructions that may be executed by the cores of CPUs 812 or other processing elements (e.g., logic resident on chipsets 816) to provide functionality associated with the manageability engine 826 or other components of platform logic 810. A platform 802 may also include one or more chipsets 816 comprising any suitable logic to support the operation of the CPUs 812. In various embodiments, chipset 816 may reside on the same die or package as a CPU 812 or on one or more different dies or packages. Each chipset may support any suitable number of CPUs 812. A chipset 816 may also include one or more controllers to couple other components of platform logic 810 (e.g., communication interface 818 or memory 814) to one or more CPUs. In the embodiment depicted, each chipset 816 also includes a manageability engine 826. Manageability engine 826 may include any suitable logic to support the operation of chipset 816. In a particular embodiment, a manageability engine 826 (which may also be referred to as an innovation engine) is capable of collecting real-time telemetry data from the chipset 816, the CPU(s) 812 and/or memory 814 managed by the chipset 816, other components of platform logic 810, and/or various connections between components of platform logic 810. In various embodiments, the telemetry data collected includes the stress information described herein.

In various embodiments, a manageability engine 826 operates as an out-of-band asynchronous compute agent which is capable of interfacing with the various elements of platform logic 810 to collect telemetry data with no or minimal disruption to running processes on CPUs 812. For example, manageability engine 826 may comprise a dedicated processing element (e.g., a processor, controller, or other logic) on chipset 816, which provides the functionality of manageability engine 826 (e.g., by executing software instructions), thus conserving processing cycles of CPUs 812 for operations associated with the workloads performed by the platform logic 810. Moreover the dedicated logic for the manageability engine 826 may operate asynchronously with respect to the CPUs 812 and may gather at least some of the telemetry data without increasing the load on the CPUs.

A manageability engine 826 may process telemetry data it collects (specific examples of the processing of stress information are provided herein). In various embodiments, manageability engine 826 reports the data it collects and/or the results of its processing to other elements in the computer system, such as one or more hypervisors 820 or other operating systems and/or system management software (which may run on any suitable logic such as system management platform 806). In particular embodiments, a critical event such as a core that has accumulated an excessive amount of stress may be reported prior to the normal interval for reporting telemetry data (e.g., a notification may be sent immediately upon detection).

Additionally, manageability engine 826 may include programmable code configurable to set which CPU(s) 812 a particular chipset 816 manages and/or which telemetry data may be collected.

Chipsets 816 also each include a communication interface 828. Communication interface 828 may be used for the communication of signaling and/or data between chipset 816 and one or more I/O devices, one or more networks 808, and/or one or more devices coupled to network 808 (e.g., system management platform 806). For example, communication interface 828 may be used to send and receive network traffic such as data packets. In a particular embodiment, a communication interface 828 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 816 (e.g., manageability engine 826 or switch 830) and another device coupled to network 808. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 828 may allow communication of data (e.g., between the manageability engine 826 and the data center management platform 806) associated with management and monitoring functions performed by manageability engine 826. In various embodiments, manageability engine 826 may utilize elements (e.g., one or more NICs) of communication interfaces 828 to report the telemetry data (e.g., to system management platform 806) in order to reserve usage of NICs of communication interface 818 for operations associated with workloads performed by platform logic 810.

Switches 830 may couple to various ports (e.g., provided by NICs) of communication interface 828 and may switch data between these ports and various components of chipset 816 (e.g., one or more Peripheral Component Interconnect Express (PCIe) lanes coupled to CPUs 812). Switches 830 may be a physical or virtual (i.e., software) switch.

Platform logic 810 may include an additional communication interface 818. Similar to communication interfaces 828, communication interfaces 818 may be used for the communication of signaling and/or data between platform logic 810 and one or more networks 808 and one or more devices coupled to the network 808. For example, communication interface 818 may be used to send and receive network traffic such as data packets. In a particular embodiment, communication interfaces 818 comprise one or more physical NICs. These NICs may enable communication between any suitable element of platform logic 810 (e.g., CPUs 812 or memory 814) and another device coupled to network 808 (e.g., elements of other platforms or remote computing devices coupled to network 808 through one or more networks).

Platform logic 810 may receive and perform any suitable types of workloads. A workload may include any request to utilize one or more resources of platform logic 810, such as one or more cores or associated logic. For example, a workload may comprise a request to instantiate a software component, such as an I/O device driver 824 or guest system 822; a request to process a network packet received from a virtual machine 832 or device external to platform 802A (such as a network node coupled to network 808); a request to execute a process or thread associated with a guest system 822, an application running on platform 802A, a hypervisor 820 or other operating system running on platform 802A; or other suitable processing request.

A virtual machine 832 may emulate a computer system with its own dedicated hardware. A virtual machine 832 may run a guest operating system on top of the hypervisor 820. The components of platform logic 810 (e.g., CPUs 812, memory 814, chipset 816, and communication interface 818) may be virtualized such that it appears to the guest operating system that the virtual machine 832 has its own dedicated components.

A virtual machine 832 may include a virtualized NIC (vNIC), which is used by the virtual machine as its network interface. A vNIC may be assigned a media access control (MAC) address or other identifier, thus allowing multiple virtual machines 832 to be individually addressable in a network.

VNF 834 may comprise a software implementation of a functional building block with defined interfaces and behavior that can be deployed in a virtualized infrastructure. In particular embodiments, a VNF 834 may include one or more virtual machines 832 that collectively provide specific functionalities (e.g., WAN optimization, virtual private network (VPN) termination, firewall operations, load balancing operations, security functions, etcetera). A VNF 834 running on platform logic 810 may provide the same functionality as traditional network components implemented through dedicated hardware. For example, a VNF 834 may include components to perform any suitable NFV workloads, such as virtualized evolved packet core (vEPC) components, mobility management entities, 3rd Generation Partnership Project (3GPP) control and data plane components, etc.

SFC 836 is a group of VNFs 834 organized as a chain to perform a series of operations, such as network packet processing operations. Service function chaining may provide the ability to define an ordered list of network services (e.g. firewalls, load balancers) that are stitched together in the network to create a service chain.

A hypervisor 820 (also known as a virtual machine monitor) may comprise logic to create and run guest systems 822. The hypervisor 820 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 810. Services of hypervisor 820 may be provided by virtualizing in software or through hardware assisted resources that require minimal software intervention, or both. Multiple instances of a variety of guest operating systems may be managed by the hypervisor 820. Each platform 802 may have a separate instantiation of a hypervisor 820.

Hypervisor 820 may be a native or bare metal hypervisor that runs directly on platform logic 810 to control the platform logic and manage the guest operating systems. Alternatively, hypervisor 820 may be a hosted hypervisor that runs on a host operating system and abstracts the guest operating systems from the host operating system. Hypervisor 820 may include a virtual switch 838 that may provide virtual switching and/or routing functions to virtual machines of guest systems 822. The virtual switch 838 may comprise a logical switching fabric that couples the vNICs of the virtual machines 832 to each other, thus creating a virtual network through which virtual machines may communicate with each other.

Virtual switch 838 may comprise a software element that is executed using components of platform logic 810. In various embodiments, hypervisor 820 may be in communication with any suitable entity (e.g., a SDN controller) which may cause hypervisor 820 to reconfigure the parameters of virtual switch 838 in response to changing conditions in platform 802 (e.g., the addition or deletion of virtual machines 832 or identification of optimizations that may be made to enhance performance of the platform).

Hypervisor 820 may also include resource allocation logic 844, which may include logic for determining allocation of platform resources based on the telemetry data (which may include stress information). Resource allocation logic 844 may also include logic for communicating with various components of platform logic 810 entities of platform 802A to implement such optimization, such as components of platform logic 810.

Any suitable logic may make one or more of these optimization decisions. For example, system management platform 806; resource allocation logic 844 of hypervisor 820 or other operating system; or other logic of computer platform 802A may be capable of making such decisions. In various embodiments, the system management platform 806 may receive telemetry data from and manage workload placement across multiple platforms 802. The system management platform 806 may communicate with hypervisors 820 (e.g., in an out-of-band manner) or other operating systems of the various platforms 802 to implement workload placements directed by the system management platform.

The elements of platform logic 810 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a GTL bus.

Elements of the computer platform 802A may be coupled together in any suitable manner such as through one or more networks 808. A network 808 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

FIG. 9 is a block diagram of rack scale design 900. In this example, RSD 900 includes a single rack 904, to illustrate certain principles of RSD. It should be understood that RSD 900 may include many such racks, and that the racks need not be identical to one another. In some cases a multipurpose rack such as rack 904 may be provided, while in other examples, single-purpose racks may be provided. For example, rack 904 may be considered a highly inclusive rack that includes resources that may be used to allocate a large number of composite nodes. On the other hand, other examples could include a rack dedicated solely to compute sleds, storage sleds, memory sleds, and other resource types, which together can be integrated into composite nodes. Thus, rack 904 of FIG. 9 should be understood to be a nonlimiting example of a rack that may be used in an RSD 900.

In the example of FIG. 9, rack 904 may be a standard rack with an external width of approximately 23.6 inches and a height of 78.74 inches. In common usage, this is referred to as a "42U rack." However, rack 904 need not conform to the "rack unit" standard. Rather, rack 904 may include a number of chassis that are optimized for their purposes.

Rack 904 may be marketed and sold as a monolithic unit, with a number of line-replaceable units (LRUs) within each chassis. The LRUs in this case may be sleds, and thus can be easily swapped out when a replacement needs to be made.

In this example, rack 904 includes a power chassis 910, a storage chassis 916, three compute chassis (924-1, 924-2, and 924-3), a 3-D Crosspoint™ (3DXP) chassis 928, an accelerator chassis 930, and a networking chassis 934. Each chassis may include one or more LRU sleds holding the appropriate resources. For example, power chassis 910 includes a number of hot pluggable power supplies 912, which may provide shared power to rack 904. In other embodiments, some sled chassis may also include their own power supplies, depending on the needs of the embodiment.

Storage chassis 916 includes a number of storage sleds 918. Compute chassis 924 each contain a number of compute sleds 920. 3DXP chassis 928 may include a number of 3DXP sleds 926, each hosting a 3DXP memory server. And accelerator chassis 930 may host a number of accelerators, such as Intel® Quick Assist™ technology (QAT), FPGAs, ASICs, or other accelerators of the same or different types. Accelerators within accelerator chassis 930 may be the same type or of different types according to the needs of a particular embodiment.

Over time, the various LRUs within rack 904 may become damaged, outdated, or may experience functional errors. As this happens, LRUs may be pulled and replaced with compatible LRUs, thus allowing the rack to continue full scale operation.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid state drive, a flash memory, or other nonvolatile medium. A computer-readable medium could also include a medium such as a ROM, an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, DSP, microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in an SoC, including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

The following examples are provided by way of illustration.

Example 1 includes a computing apparatus, comprising: a fiber-optic transmitter comprising a laser source; an input waveguide to receive a modulated laser pulse from the laser source; an output waveguide to direct the modulated laser pulse to an external communication element; and an isolator bridge optically coupled to the input waveguide and output waveguide, the isolator bridge comprising an input lens, an input-side folding prism, an isolator element, an output-side folding prism, and an output lens, wherein an input light pulse through the input lens is to be redirected by the input-side folding prism through the isolator element to the output-side folding prism, and redirected by the output-side folding prism through the output lens.

Example 2 includes the computing apparatus of example 1, wherein the laser source provides a low numerical aperture laser, and wherein the input lens and output lens together provide a 1:1 magnification.

Example 3 includes the computing apparatus of example 1, wherein the input lens and output lens together provide a 1:N magnification, wherein N>1, to compensate for a higher numerical aperture on the input side than on the output side.

Example 4 includes the computing apparatus of example 3, wherein N≅3.

Example 5 includes the computing apparatus of example 3, wherein N≅4.

Example 6 includes the computing apparatus of example 3, wherein N is between approximately 2 and approximately 5.

Example 7 includes the computing apparatus of examples 1-6, wherein the isolator element comprises magnetized garnet.

Example 8 includes the computing apparatus of examples 1-6, comprising a common emission trench spanning the input and output sides, wherein the isolator bridge is rotated approximately 90 degrees with respect to the common emission trench.

Example 9 includes the computing apparatus of examples 1-6, comprising a plurality of input waveguides, with one input lens per input waveguide.

Example 10 includes the computing apparatus of examples 1-6, comprising a plurality of input waveguides to optically couple to a plurality of output waveguides, with a single input lens to service the plurality of input waveguides, wherein the input-side and output-side folding prisms redirects light from the waveguides at non-90 degree angles, and wherein the output waveguides are arranged in an order reversed from an order of the input waveguides.

Example 11 includes the computing apparatus of examples 1-6, comprising multiple input and output waveguides, and V-grooves to receive the input and output waveguides.

Example 12 includes the computing apparatus of example 11, wherein some V-grooves are configured to receive multiple waveguides, and some V-grooves are configured to receive a single waveguide.

Example 13 includes the computing apparatus of example 11, comprising an input lens per input waveguide and an output lens per output waveguide.

Example 14 includes a circuit assembly, comprising: an integrated circuit comprising a multi-wavelength laser communication source, a plurality of incoming waveguides, the incoming waveguides to receive laser inputs of different wavelengths, and a plurality of outgoing waveguides paired to the incoming waveguides; and a separately-fabricated optical isolator bridge affixed to the integrated circuit to couple the incoming waveguides to the outgoing waveguides with optical isolation, the isolator bridge comprising at least one incoming-side lens, an incoming-side folding prism, an isolator element, an outgoing-side folding prism, at least one outgoing-side lens, wherein an incoming light pulse through the incoming-side lens is to be redirected at an angle by the incoming-side folding prism, through the isolator element to the outgoing-side folding prism, and redirected at an angle by the outgoing-side folding prism through the outgoing-side lens.

Example 15 includes the circuit assembly of example 14, wherein the multi-wavelength laser source provides a low numerical aperture laser, and wherein the incoming-side lens and outgoing-side lens together provide a 1:1 magnification.

Example 16 includes the circuit assembly of example 14, wherein the incoming-side lens and outgoing-side lens together provide a 1:N magnification, wherein N>1, to compensate for a higher numerical aperture on the incoming side than on the outgoing side.

Example 17 includes the circuit assembly of example 16, wherein N≅3.

Example 18 includes the circuit assembly of example 16, wherein N≅4.

Example 19 includes the circuit assembly of example 14, wherein N is between approximately 2 and approximately 5.

Example 20 includes the circuit assembly of example 14, wherein the isolator element comprises magnetized garnet.

Example 21 includes the circuit assembly of example 14, wherein the integrated circuit comprises a common emission trench spanning the incoming and outgoing sides, wherein the optical isolator bridge is rotated approximately 90 degrees with respect to the common emission trench.

Example 22 includes the circuit assembly of example 14, comprising one incoming-side lens per incoming waveguide.

Example 23 includes the circuit assembly of example 14, comprising a single incoming-side lens to service the plurality of incoming waveguides, wherein the incoming-side and outgoing-side folding prisms redirect light from the waveguides at non-90 degree angles, and wherein the outgoing waveguides are arranged in an order reversed from an order of the incoming waveguides.

Example 24 includes the circuit assembly of example 14, comprising V-grooves to receive the incoming and outgoing waveguides.

Example 25 includes the circuit assembly of example 24, wherein some V-grooves are configured to receive multiple waveguides, and some V-grooves are configured to receive a single waveguide.

Example 26 includes the circuit assembly of example 24, comprising an incoming lens per incoming waveguide and an outgoing lens per outgoing waveguide.

Example 27 includes an optical isolator bridge assembly, comprising: an interface to mechanically and optically couple to a plurality of input-side waveguides and a plurality of output-side waveguides; M input-side lenses; an input-side prism to redirect an input laser pulse at a first angle through an isolator element; an output-side prism to receive the light pulse from the isolator elements and redirect it at a second angle; and M output-side lenses.

Example 28 includes the optical isolator bridge of example 27, wherein the optical isolator bridge is an article of a semiconductor manufacturing process.

Example 29 includes the optical isolator bridge of example 27, wherein M is equal to the number of input-side waveguides and output-side waveguides, and wherein the first angle and second angle are substantially 90 degrees.

Example 30 includes the optical isolator bridge of example 27, wherein M=1, and wherein the first angle and second angle are not substantially 90 degrees.

Example 31 includes the optical isolator bridge of example 27, wherein input-side lenses and output-side lenses together provide a 1:1 magnification.

Example 32 includes the optical isolator bridge of example 27, wherein the input-side lenses and output-side lens together provide a 1:N magnification, wherein N>1, to compensate for a higher numerical aperture on the input side than on the output side.

Example 33 includes the optical isolator bridge of example 32, wherein N≅3.

Example 34 includes the optical isolator bridge of example 32, wherein N≅4.

Example 35 includes the optical isolator bridge of example 32, wherein N is between approximately 2 and approximately 5.

Example 36 includes the optical isolator bridge of example 27, wherein the isolator element comprises magnetized garnet.

What is claimed is:

1. A computing apparatus, comprising:
   a fiber-optic transmitter comprising a laser source;
   an input waveguide to receive a modulated laser pulse from the laser source;
   an output waveguide to direct the modulated laser pulse to an external communication element;
   an isolator bridge optically coupled to the input waveguide and output waveguide, the isolator bridge comprising an input lens, an input-side folding prism, an input-side polarizer, an isolator element, an output-side polarizer, an output-side folding prism, and an output lens, wherein an input light pulse through the input lens is to be redirected by the input-side folding prism through the isolator element to the output-side folding prism, and redirected by the output-side folding prism through the output lens; and
   a plurality of input waveguides to optically couple to a plurality of output waveguides, with a single input lens to service the plurality of input waveguides, wherein the input-side and output-side folding prisms redirect light from the waveguides at non-90 degree angles, and wherein the output waveguides are arranged in an order reversed from an order of the input waveguides.

2. The computing apparatus of claim 1, wherein the laser source provides a low numerical aperture laser, and wherein the input lens and output lens together provide a 1:1 magnification.

3. The computing apparatus of claim 1, wherein the input lens and output lens together provide a 1:N magnification, wherein N>1, to compensate for a higher numerical aperture on the input side than on the output side.

4. The computing apparatus of claim 3, wherein N=3.

5. The computing apparatus of claim 3, wherein N=4.

6. The computing apparatus of claim 3, wherein N is between approximately 2 and approximately 5.

7. The computing apparatus of claim 1, wherein the isolator element comprises magnetized garnet.

8. The computing apparatus of claim 1, comprising a common emission trench spanning the input and output sides, wherein the isolator bridge is rotated approximately 90 degrees with respect to the common emission trench.

9. The computing apparatus of claim 1, comprising a plurality of input waveguides, with one input lens per input waveguide.

10. The computing apparatus of claim 1, comprising V grooves to receive the input and output waveguides.

11. The computing apparatus of claim 10, wherein some V-grooves are configured to receive multiple waveguides, and some V-grooves are configured to receive a single waveguide.

12. The computing apparatus of claim 1, comprising an input lens per input waveguide and an output lens per output waveguide.

13. A circuit assembly, comprising:
    an integrated circuit comprising a multi-wavelength laser communication source, a plurality of incoming waveguides, the incoming waveguides to receive laser inputs of different wavelengths, and a plurality of outgoing waveguides paired to the incoming waveguides;
    V-grooves to receive the input and output waveguides, wherein some V-grooves are configured to receive multiple waveguides, and some V-grooves are configured to receive a single waveguide; and
    a separately-fabricated optical isolator bridge affixed to the integrated circuit to couple the incoming waveguides to the outgoing waveguides with optical isolation, the isolator bridge comprising at least one incoming-side lens, an incoming-side folding prism, an incoming-side polarizer, an isolator element, an outgoing-side polarizer, an outgoing-side folding prism, at least one outgoing-side lens, wherein an incoming light pulse through the incoming-side lens is to be redirected at an angle by the incoming-side folding prism, through the isolator element to the outgoing-side folding prism, and redirected at an angle by the outgoing-side folding prism through the outgoing-side lens.

14. The circuit assembly of claim 13, wherein the integrated circuit comprises a common emission trench spanning the incoming and outgoing sides, wherein the optical isolator bridge is rotated approximately 90 degrees with respect to the common emission trench.

15. An optical isolator bridge assembly, comprising:
    an interface to mechanically and optically couple to a plurality of input-side waveguides and a plurality of output-side waveguides;
    V-grooves to receive the input-side and output-side waveguides, wherein some V-grooves are configured to receive multiple waveguides, and some V-grooves are configured to receive a single waveguide
    M input-side lenses;

an input-side prism to redirect an input laser pulse at a first angle through an isolator element;
an input-side polarizer;
an output-side prism to receive the light pulse from the isolator elements and redirect it at a second angle;
an output-side polarizer; and
M output-side lenses.

16. The optical isolator bridge of claim 15, wherein the optical isolator bridge is an article of a semiconductor manufacturing process.

17. The optical isolator bridge of claim 15, wherein M is equal to the number of input-side waveguides and output-side waveguides, and wherein the first angle and second angle are substantially 90 degrees.

18. The optical isolator bridge of claim 15, wherein input-side lenses and output-side lenses together provide a 1:1 magnification.

19. The optical isolator bridge of claim 15, wherein the input-side lenses and output-side lenses together provide a 1:N magnification, wherein N>1, to compensate for a higher numerical aperture on an input side than on an output side.

* * * * *

UNITED STATES PATENT AND TRADEMARK OFFICE
CERTIFICATE OF CORRECTION

PATENT NO. : 10,852,491 B2  
APPLICATION NO. : 16/228577  
DATED : December 1, 2020  
INVENTOR(S) : Alexander Krichevsky et al.

It is certified that error appears in the above-identified patent and that said Letters Patent is hereby corrected as shown below:

In the Claims

In Column 24, Lines 23-24, in Claim 11, delete "V grooves" and insert -- V-grooves --, therefor.

In Column 24, Line 66, in Claim 16, after "waveguide" insert -- ; --, therefor.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*